United States Patent [19]

Masters

[11] Patent Number: 6,001,062
[45] Date of Patent: Dec. 14, 1999

[54] SLEWING BANDPASS FILTER FOR SELECTIVE PASSAGE OF TIME VARYING ACOUSTIC SIGNALS

[75] Inventor: Donald Masters, Sunnyvale, Calif.

[73] Assignees: Scimed Life Systems, Inc., Maple Grove, Minn.; Boston Scientific Limited, West Indies, Barbados

[21] Appl. No.: 09/128,396

[22] Filed: Aug. 3, 1998

[51] Int. Cl.[6] ................................................. A61B 8/00
[52] U.S. Cl. ........................................ 600/443; 600/447
[58] Field of Search .................................. 600/437, 440, 600/443, 444, 447

[56] References Cited

U.S. PATENT DOCUMENTS

| | | | |
|---|---|---|---|
| 5,873,830 | 2/1999 | Hossack et al. | 600/447 |
| 5,876,342 | 3/1999 | Chen et al. | 600/443 |
| 5,897,500 | 4/1999 | Zhao | 600/443 |
| 5,908,389 | 6/1999 | Roundhill et al. | 600/443 |

*Primary Examiner*—Marvin M. Lateef
*Assistant Examiner*—Ali M. Imam
*Attorney, Agent, or Firm*—Townsend and Townsend and Crew LLP

[57] ABSTRACT

An ultrasound imaging system with a slewing bandpass filter is disclosed for selective passage of time varying acoustic signals. The acoustic signals represent artifacts of reflection of tissue and fluid. The bandpass filter includes two mixers and two fixed bandpass filters. The signal sources each provide a reference signal for two local oscillators. The first mixer mixes the input and first reference signals to a desired first frequency range. The first fixed bandpass filter has a top passband frequency above the first frequency range and provides a first filtered output signal. The second mixer mixes the first filtered signal and the second reference signal to a desired second frequency range. The second fixed bandpass filter has a center frequency and bandwidth not overlapping with the first bandpass filter. The second fixed bandpass filter provides a second filtered output signal with a scannable variable bandwidth passband characteristic useful for examining the time varying characteristics of the input signal. The slewing bandpass filter also includes a control means for controlling the first and second signal sources in accordance with time-varying characteristics of interest.

30 Claims, 4 Drawing Sheets

SLEWING BANDPASS FILTER FOR SELECTIVE PASSAGE OF TIME VARYING ACOUSTIC SIGNALS

BACKGROUND OF THE INVENTION

This invention relates to electronic processing of image information, and more particularly to spectral analysis of acoustic signals used to identify images in tissue and other complex close-spaced structures.

Arteriosclerosis, also known as atherosclerosis, is a common human ailment arising from the deposition of fatty-like substances, referred to as atheromas or plaque, on the walls of blood vessels. Such deposits occur in both the peripheral blood vessels, which feed the limbs of the body, and the coronary vessels, which feed the heart. When deposits accumulate in localized regions of a blood vessel, stenosis, or narrowing of the vascular channel, occurs. As a result, blood flow is restricted and the person's health and life are at great risk.

Numerous approaches for reducing and removing such vascular deposits are known, including balloon angioplasty, in which a balloon-tipped catheter is used to dilate a region of atheroma; atherectomy, in which a blade or cutting bit is used to sever and remove the atheroma; spark gap reduction, in which an electrical spark burns through the plaque; and laser angioplasty, in which laser energy is used to ablate at least a portion of the atheroma. In order to facilitate treatment of stenosis, it is often desirable to obtain a visual image of the interior of the blood vessel within the region of interest. Catheters with imaging elements such as ultrasonic transducers are often used to obtain these images.

In intraluminal ultrasound imaging, the ultrasonic transducers direct ultrasonic pressure waves radially at a target area. These transducers then collect echos from the target area to form an image. The resolution of the images can be increased by utilizing higher frequency ultrasound waves. However, as the frequencies are increased, a significant problem arises.

The ultrasound waves pass through blood to reach the vessel wall tissue. As a result, the transducers also collect undesirable echoes and scattered waveforms from blood cells. In fact, the amount of ultrasound scattering from the blood cells is proportional to the fourth power of the frequency of the ultrasonic wave. As the size of the acoustic wavelength approaches the size of the blood cell, the blood cells start absorbing the energy and radiating the energy back. This problem becomes so significant at higher frequencies that the generated images are practically unusable because the tissue is indistinguishable from the blood.

FIG. 1A illustrates an exemplary ultrasound image according to the prior art. A transducer with a frequency of 20 MHz may be utilized to produce such an image. Regions 102 represent elements that may be of interest to an inspecting user such as a physician. These elements may include atheromas, plaque, and calcium deposits. However, since blood cells have a tendency to scatter some energy, the unprocessed image may also include undesirably bright blood echo regions. Accordingly, the current ultrasound images can include unwanted regions. These undesired regions increase in number and area as higher frequency transducers are utilized.

FIG. 1B illustrates an exemplary unprocessed ultrasound image from a higher frequency transducer. A transducer frequency of 30 MHz and higher may be utilized to produce such an image. Regions 104 represent elements that may be of interest to the user. As shown, the higher frequency transducer creates more regions for the user to inspect. Some of the additional regions are due to the blood echoes. Hence, the user will have a harder task when attempting to identify the true elements of interest such as atheromas, plaque, or calcium deposits.

In the past, the spectrum of interest of an ultrasound image was chosen by selecting from among a group of fixed bandpass filters. Several bandwidths and center frequencies would be chosen in an attempt to match the mechanical parameters of the transducer from which the image information was obtained. The result was a complex and cumbersome process for analyzing the image information. Prior ultrasound image processors include the Ultra instrument system marketed by Scimed Life Systems, Inc. of Maple Grove, Minn.

Prom the foregoing, it will be readily understood that it is desirable to provide ultrasound imaging over a broad range of frequencies, especially higher ultrasonic frequencies, while eliminating the undesired backscatter from the blood cells.

SUMMARY OF THE INVENTION

According to the invention, in an ultrasound image processing apparatus operative to receive analog signals representative of acoustic information reports from a tissue, such as in intravascular ultrasound imaging, a bandpass filter system forms a well-defined passband which is used to produce a continuous-phase signal from the received raw ultrasound signal to minimize the effects of unwanted signals produced by excitation interaction with normal blood. In a particular embodiment, the filter system to employs fixed electroacoustic filters with very narrow bandwidth through which a signal to be filtered is applied and is selectively and optionally dynamically tuned to frequencies of responses to ultrasound excitation. The filter system is variably tunable around either the fundamental or the second harmonic frequency of ultrasound excitation. In a particular embodiment, the filter system is realized through a set of mixers in conjunction with fixed-frequency surface acoustic wave bandpass filters.

The invention has numerous advantages. The filter system can be matched to the exact characteristic frequency and mechanical parameters of a chosen transducer as characterized by the bandwidth of the transducer, so that the fall sensitivity of the individual transducer can be exploited. The bandwidth and center frequency of the filter can also be selectively tuned to maximize the tissue-signal to blood-noise ratio, with appropriate selection of a transducer which is deployed via a catheter within a vascular system. This improves the ability to locate tissue material and stents.

In particular, the ability to tune to the second harmonic allows the segmentation of portions of the image for selective examination. For example, reflections from healthy tissue can be segmented from dense tissue and stents because they reflect ultrasound energy with a discernable spectral difference. The segmentation also permits easier inspection when comparing different images. For example, in one embodiment, fundamental and second harmonic images are displayed side-by-side. In another embodiment, selective artifacts representing the segments are colorized and the colorized images are overlaid in the display presentation for ease of comparison.

In the present invention, different frequency components of the return echo can be selected for viewing, e.g., blood reflectivity is very frequency dependent. In addition, frequency can be changed over time so as to permit different portions of the echo along the vector to be inspected at different frequencies. Scanning the spectrum with an adaptive slewing bandpass filter system can produce a change in the brightness ratio of blood-to-tissue in the ultrasound image. An operator may select a desired spectrum. An optimum signal-to-noise ratio can be maintained along the vector of the echoed return signal by reducing the bandwidth versus time. The passband slewing concept can be in part implemented by using two tunable mixer stages and two fixed bandpass filters.

The invention will be better understood by reference to the following detailed description in connection with the accompanying drawings.

DESCRIPTION OF SPECIFIC EMBODIMENTS

Figure 2:
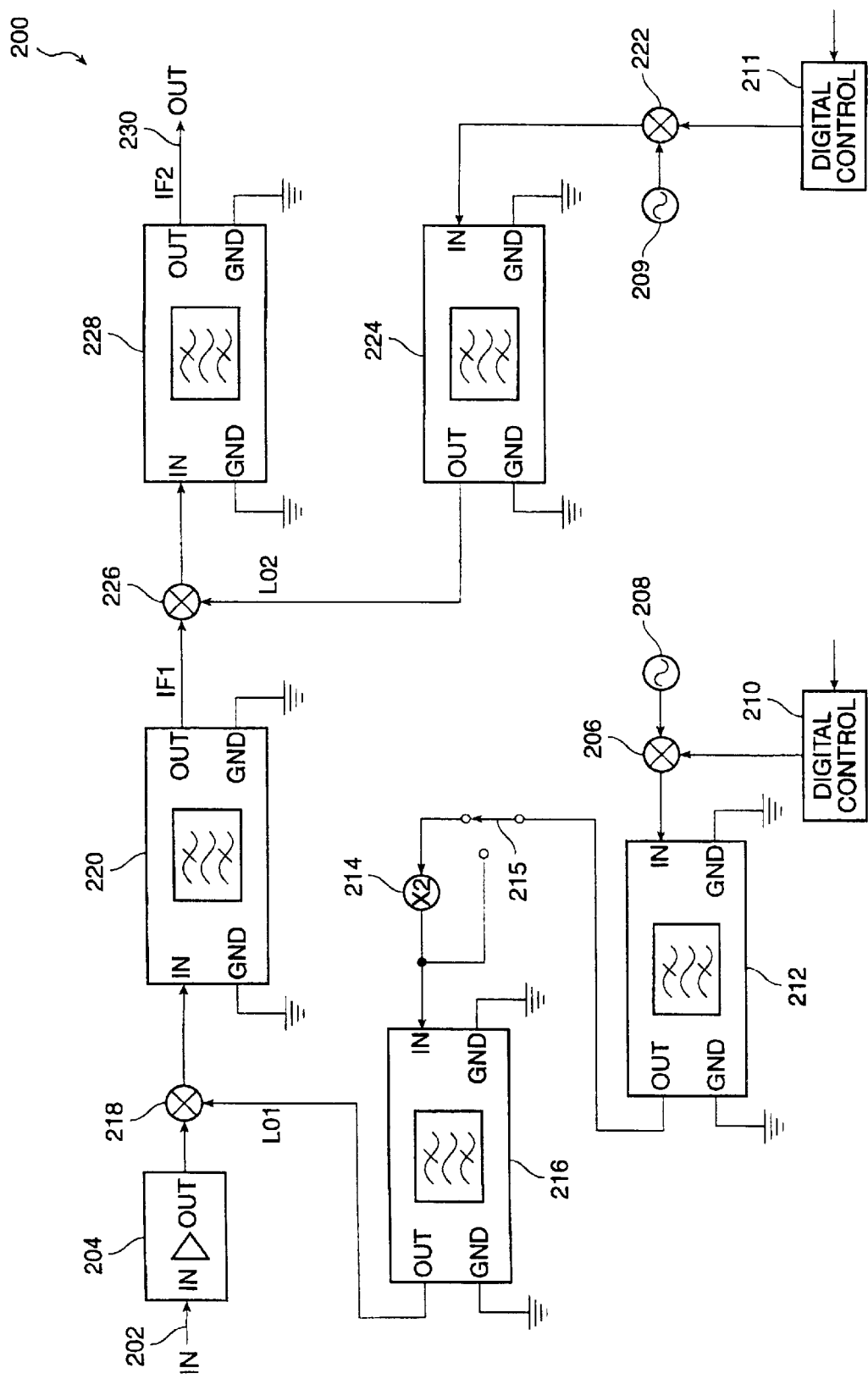
FIG. 2 is a circuit block diagram according to one embodiment of the present invention.

FIG. 2 illustrates one embodiment of the present invention. An electronic filter system 200 comprises a pair of slewing mixers 218 and 226 (which produce a slewing bandpass filter passband) and bracketing filters 220 and 228 operative in intermediate frequency ranges. The filter system 200 receives an input signal at an input node 202 (IN). The input signal can be an analog signal representative of acoustic information reports from a tissue. The input signal can be generated by any of a variety of transducers, such as acoustic transducers. The transducer equipment is preferably one of Scimed Models Ultra-30 and Discovery-40, which generate an electrical signal at about 30 MHz or higher with a bandwidth of about 50 percent (+/−7.5 MHz at 30 MHz, +/−10 MHz at 40 MHz).

A buffer 204 amplifies the received input signal and supplies it to an input mixer 218, which also receives a variable frequency local oscillator signal LO1 out of a relatively broad-band bandpass filter 216. The signal supplied to the filter 216 originates with reference signal generated by a signal source 208. The reference signal is preferably a sinusoidal waveform with a fundamental frequency of about 170 MHz, which is supplied directly to a first mixer 206.

The first mixer 206 also receives a signal from a first digital controller 210. Digital controllers are the primary tuning elements. It is preferably a direct digital signal synthesizer which produces a phase-continuous accurate analog sinusoidal signal, such as Analog Devices Model 8007 which is tunable between about 0 MHz and 40 MHz. Alternatively, a voltage controlled oscillator can be used instead of the digital controller, so long as the tuning range includes the bandwidth. The digital controller 210 may be internally preprogrammed, or an input control can be provided by an external digital computer (not shown) which enables real-time software controlled adjustments to establish the rate and range of frequency slew.

The first mixer 206 mixes the reference signal from the reference generator 208 and the digital controller 210 to generate an output signal in the range of about 180 MHz to 150 MHz. The output frequency of the first mixer 206 can be controlled precisely by the digital controller 210.

The output of the first mixer 206 is applied to a first bandpass filter 212. The first bandpass filter 212 can have any configuration but preferably it is a fixed electronic filter with a center frequency of 70 MHz and a bandwidth of 40 MHz. The first bandpass filter 212 is optionally coupled to a signal multiplier 214 through a selector switch 215. The signal multiplier 214 preferably multiplies the signal from the first bandpass filter 212 by two where second harmonic image analysis is undertaken. Otherwise the signal is fed directly on. The output, optionally via the signal multiplier 214, is coupled to a second bandpass filter 216. The second bandpass filter 216 preferably also is an electronic filter with a center frequency of 140 MHz and a bandwidth of 40 MHz. Bandpass filters 212 and 216 are required for each mixer output to assure suppression of unnecessary spurious product signals. (It is not necessary to provide two sets of filters if there is a way to generate a slewing reference signal of the desired frequency. The signal may be required to be phase synchronized to other signals in other subsystems not a part of this invention.)

The output of the second bandpass filter 216 provides the first local oscillator signal (LO1), which is fed to the input mixer 218 together with the amplified input signal. The input mixer 218 is preferably a high-side mixer to provide the difference between the amplified input signal and the first local oscillator as an output. Alternatively, the input mixer 218 can be a low-side mixer, which would provide as an output the sum of the amplified input signal and the first local oscillator. For example, if the first local oscillator has a frequency of about 170 MHz and the amplified input signal has a frequency of about 30 MHz, a high-side mixer would provide an output at about 140 MHz. Alternatively, a low-side mixer would provide the desired output at about 140 MHz if the first local oscillator has a frequency of about 110 MHz and the amplified input signal has a frequency of about 30 MHz.

The output of the input mixer 218 is coupled to a third bandpass filter 220. The third bandpass filter 220 can have any configuration but preferably it is a surface acoustic wave device with sharp roll-off on a bandwidth of 28 MHz around a center frequency of 140 MHz. In one embodiment, based on the frequency of the first local oscillator (LO1), the input mixer 218 adaptively adjusts the frequency band of the output of the input mixer 218 relative to the pass band of the third bandpass filter 220.

The output of a second reference signal source 209 and the output of a second digital controller 211 are also coupled to a third mixer 222.

Output of the third mixer 222 is coupled to a fourth bandpass filter 224. The fourth bandpass filter can have any configuration but preferably has a center frequency of 210

MHz and a bandwidth of 40 MHz. The fourth bandpass filter 224 is required primarily to eliminate unnecessary, spurious signal artifacts from the mixer 222 Output of the fourth bandpass filter 224 provides a second local oscillator signal (LO2) which is fed to a fourth mixer 226. The fourth mixer 226 is also coupled to receive a signal from the third bandpass filter 220. The fourth mixer 226 can be a low-side mixer or a high-side mixer. Preferably, both the fourth mixer 226 and the input mixer 218 are high-side mixers for optimum image noise rejection, and local oscillator leakage, but this selection could be modified depending upon the nature of the transducer.

The fourth mixer 226 is coupled to a fifth bandpass filter 228. The fifth bandpass filter can have any configuration but preferably is a surface acoustic wave filter which has a sharp roll-off around a bandwidth of 28 MHz at a center frequency of 70 MHz. In one embodiment, based on the frequency of the second local oscillator (LO2), the fourth mixer 226 adaptively adjusts the frequency band of the output of the fourth mixer 226 relative to the fixed passband of the fifth bandpass filter 228. The circuit 2C400 generates an output signal at node 230 (OUT) which is used to produce a display based on selected frequency-sensitive components to be observed in a desired processed image extracted from the input signal.

Figure 3A:
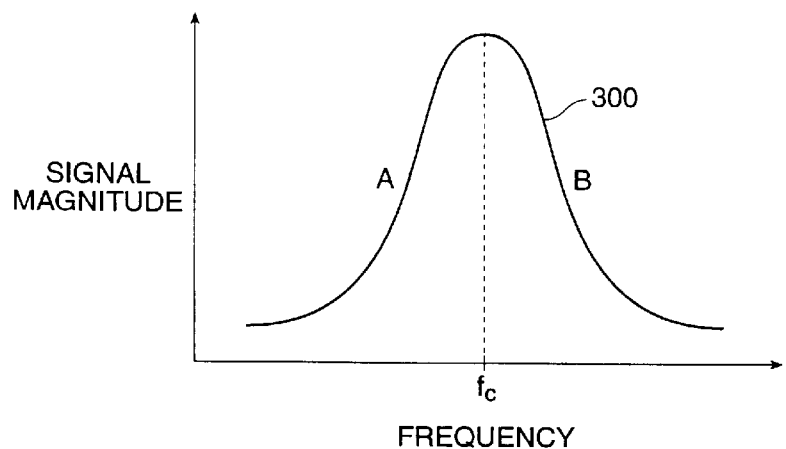
FIG. 3A illustrates an exemplary signal envelope of the input signal.

FIG. 3A illustrates an exemplary signal envelope of the input signal 300. The input signal has a center frequency of about $f_c$ MHZ. The center frequency of the input signal can be any value but is preferably 30 MHz or higher. The input signal has two sides labeled as A and B.

Figure 3B:
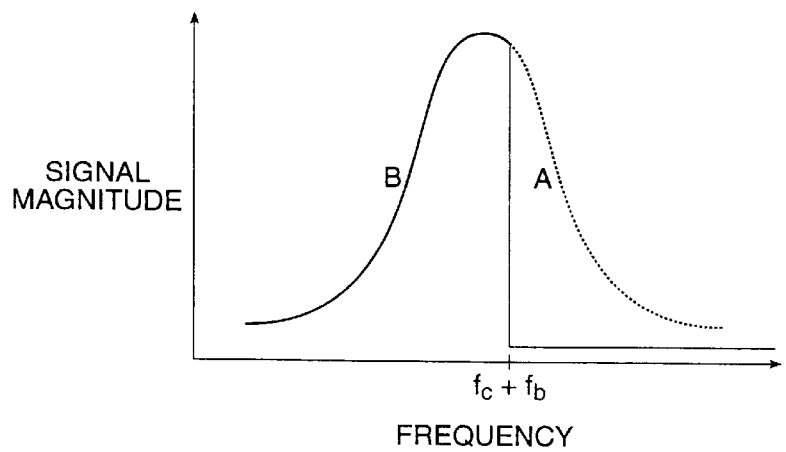
FIG. 3B illustrates a resulting exemplary signal envelope after the input signal is processed according to one aspect of the present invention.

FIG. 3B illustrates a resulting exemplary signal envelope after the input signal is passed through a first stage of the circuit shown in FIG. 2, according to one aspect of the present invention. In FIG. 2, this signal is referred as IF1. Also, with respect to FIG. 3A, the input signal sides are flipped, so that side A appears where side B was, and vice versa. The first stage can include the input mixer 218, the first local oscillator (LO1), and the third bandpass filter 220. As shown in FIG. 3B, the upper sideband of the signal is cut based on the values utilized for the first stage of the filter. For example, the upper sideband is cut at a frequency of $f_c + f_b$, where $f_c$ is the center frequency of the input signal and $f_b$ is the half power bandwidth of the desired passband.

Figure 3C:
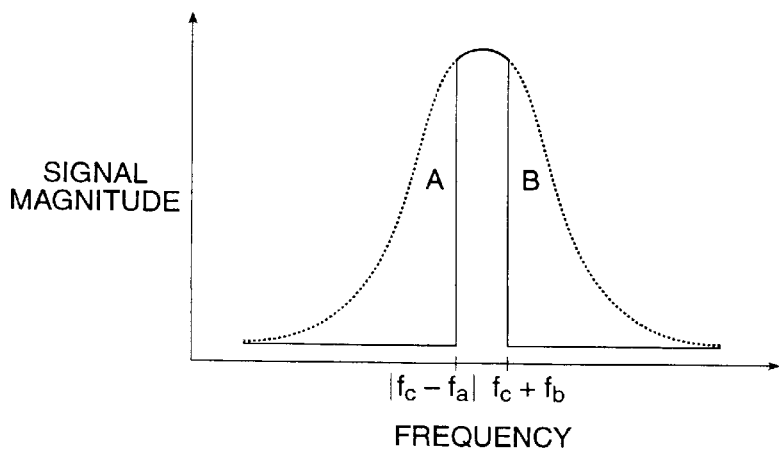
FIG. 3C illustrates a resulting exemplary signal envelope after a signal is processed in accordance with another aspect of the present invention.

FIG. 3C illustrates a resulting exemplary signal envelope after the IF1 signal is passed through a second stage of the circuit shown in FIG. 2. Again, the signal sides are flipped and side A appears where side B was, and vice versa. The second stage can include the fourth mixer 226, the second local oscillator (LO2), and the fifth bandpass filter 228. In FIG. 2, the output of the second stage is referred as IF2. As shown in FIG. 3C, the lower sideband of the signal is cut based on the values utilized for the second stage of the filter. For example, the lower sideband is cut at a frequency of $|f_c - f_a|$, where $f_c$ is the center frequency of the input signal and $f_a$ is the half power bandwidth of the desired passband. The resultant signal envelope is a very narrow, continous phase passband.

For second harmonic imaging, the first and second stage parameters are set to pass the second harmonic values of the transducer, tissue, or dense tissue. For this purpose, the frequency doubler 214 is invoked.

Other examples of center frequency values are shown in Table 1. In Table 1, all values are in MHz. The bandwidth for each center frequency is 50%. LO1, LO2, IF1, and IF2 are all shown in FIG. 2. Parameters $f_{bpf1}$ and $f_{bpf2}$ represent the center frequency of the third 220 and fifth 228 bandpass filters of FIG. 2, respectively. It is also assumed that the signal is first mixed down and then mixed up.

TABLE 1

| Transducer | LO1 | IF1 | LO2 | IF2 |
|---|---|---|---|---|
| Bandwidth = 20 MHz +/− 10 MHz | | $f_{bpf1}$ = 150 MHz; | $f_{bpf2}$ = 60 MHz | |
| 10 | 137.5 | 157.5 | 95.0 | 62.5 |
| 20 | 135.0 | 155.0 | 90.0 | 65.0 |
| 30 | 122.5 | 152.5 | 85.0 | 67.5 |
| 40 | 110.0 | 150.0 | 80.0 | 70.0 |
| Bandwidth = 30 MHz +/− 15 MHz | | $f_{bpf1}$ = 155 Hz; | $_{bpf2}$ = 55 MHz | |
| 10 | 137.5 | 157.5 | 100.0 | 57.5 |
| 20 | 135.0 | 155.0 | 95.0 | 60.0 |
| 30 | 122.5 | 152.5 | 90.0 | 62.5 |
| 40 | 110.0 | 150.0 | 85.0 | 65.0 |
| Bandwidth '2 40 MHz +/− 20 MHz | | $f_{bpf1}$ = 160 MHz; | $f_{bpf2}$ = 50 MHz | |
| 10 | 137.5 | 157.5 | 105.0 | 52.5 |
| 20 | 135.0 | 155.0 | 100.0 | 55.0 |
| 30 | 122.5 | 152.5 | 95.0 | 57.5 |
| 40 | 110.0 | 150.0 | 90.0 | 60.0 |

Figure 1A:
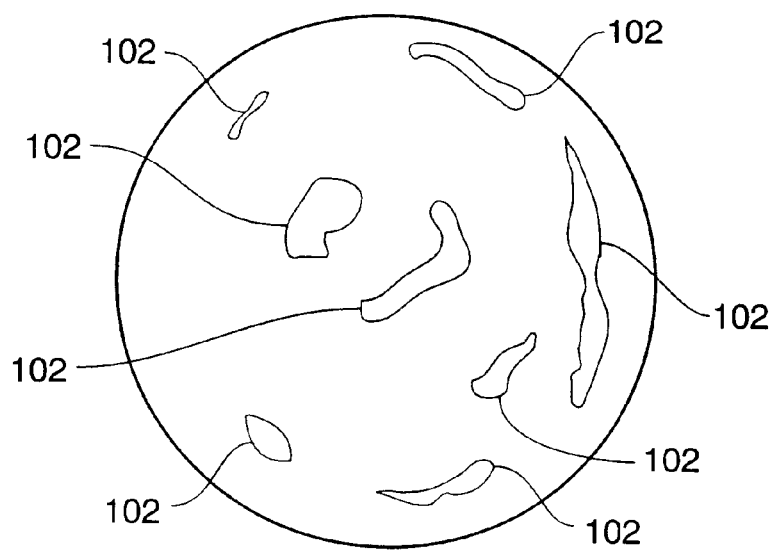
FIG. 1A illustrates an exemplary ultrasound image according to the prior art.
Figure 1B:
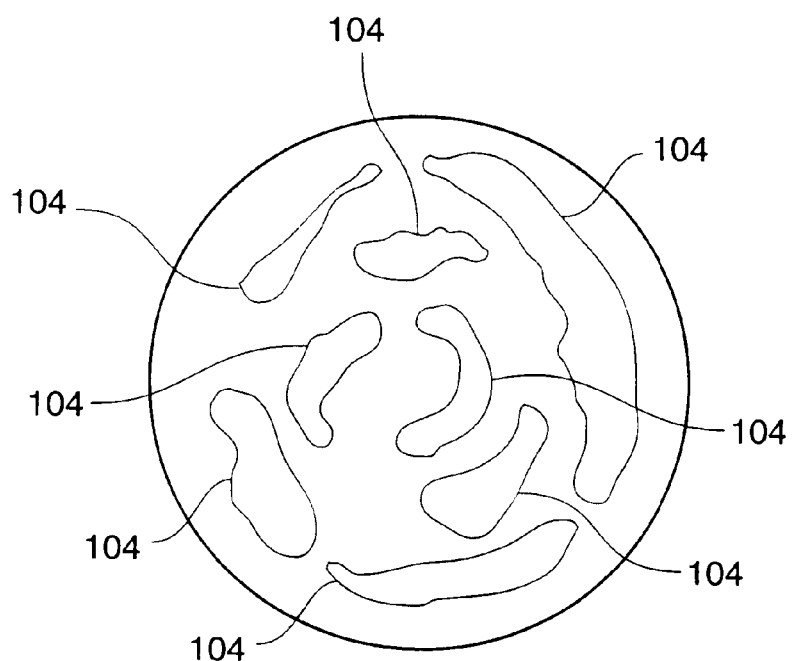
FIG. 1B illustrates an exemplary unprocessed ultrasound image from a higher frequency transducer than that used to produce the image of FIG. 1A.
Figure 4A:
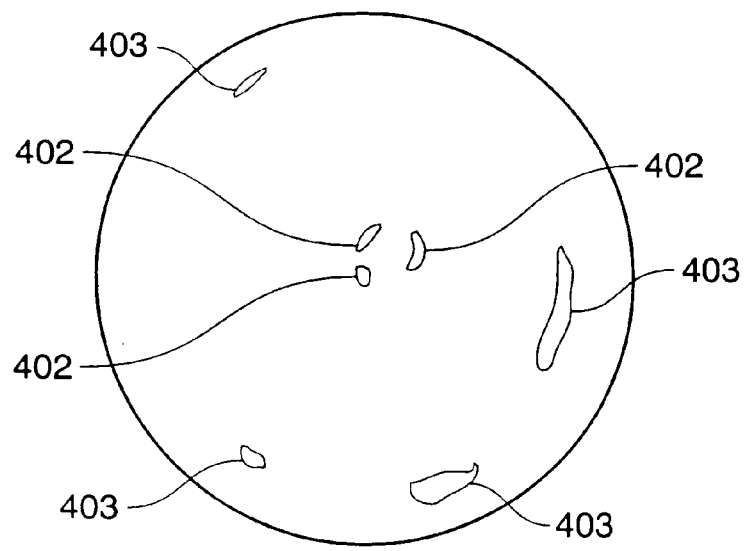
FIG. 4A illustrates an exemplary ultrasound image produced in accordance with one aspect of the present invention.

FIG. 4A illustrates an exemplary ultrasound image produced in accordance with one aspect of the present invention. According to the present invention, a transducer with a frequency of about 30 MHz or higher is utilized to produce the input signal. The input signal is then processed in accordance with one aspect of the present invention. In FIG. 4A, regions 402 represent elements that may be of interest to the user, as opposed to regions 403, which may also appear and are of lesser interest. When compared with an unprocessed image such as illustrated in FIG. 1B, FIG. 4A illustrates the advantage of the present invention provided by segmentation of the image elements.

Figure 4B:
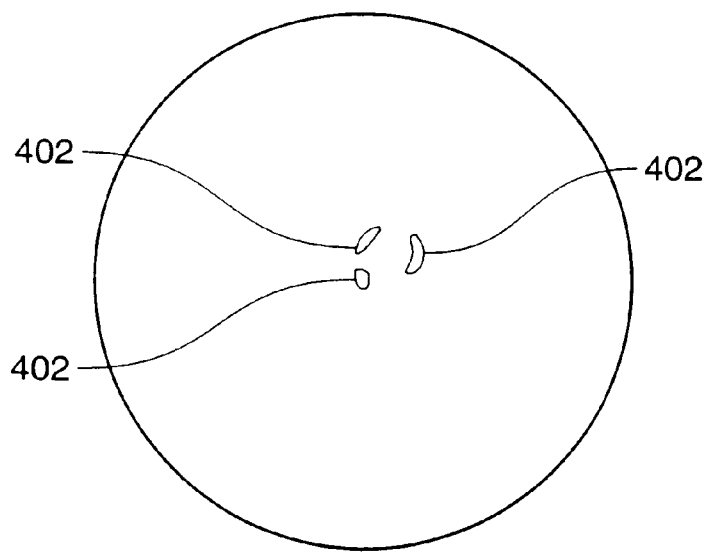
FIG. 4B illustrates an improved exemplary second harmonic ultrasound image produced in accordance with another aspect of the present invention.

FIG. 4B illustrates an improved exemplary second harmonic ultrasound image produced in accordance with one aspect of the present invention. As discussed above, the first and second filter stages may be tuned to the second harmonic. Regions 402 represent a segmentation of elements between elements 402 and 403 that may be of interest to the user. The relatively lower number of elements shown, together with a higher segmentation of the image, enables a viewer to identify regions of interest more quickly and accurately.

The ultrasound images may be displayed on any high-resolution video display monitor. Multiple images may also be displayed side-by-side. For example, the image of the processed fundamental frequency can be displayed next to the image of the second harmonic. The side-by-side display of images enables the user to more quickly compare the regions of interest. The images may also be overlapped for comparison purposes. For example, the second harmonic image may be colored differently and overlaid onto the fundamental image.

Alternatively, a computer can be utilized to display the ultrasound images. The computer can capture the images into a digital format. The digital images may then be more readily manipulated. For example, the area of each region may be measured. The intensity of signal in each region may be color coded to more clearly demonstrate the elements of interest. Also, a color coded second fundamental image can be displayed next to the fundamental picture, or alternatively, overlaid on the fundamental picture.

While the above is a complete description of the preferred embodiments of the invention, various alternatives, modifications, and equivalents may be utilized. For example, different types of mixers and filters, such as acoustic wave filters, may be used. A bank of bandpass filters can be used to choose different rejection slopes. High-side and low-side mixers may be utilized to achieve the best signal-to-noise ratio. Other values for center frequencies and bandwidths can also be utilized. Additional buffers and matching networks can be included, for example, on the input and output of each filter. Therefore, the above description should not be taken as limiting the scope of the invention which is defined by the appended claims.

What is claimed is:

1. In an ultrasound imaging system, a slewing bandpass filter for selective passage of time varying acoustic signals representative of artifacts of reflection of tissue and fluid, the adaptive bandpass filter comprising:

an input node configured to receive unprocessed signals at a frequency of reflected artifact signals, the unprocessed signals constituting an input signal;

a first signal source configured to provide a first reference signal;

a first mixer configured to receive the input signal and the first reference signal, and further configured to mix the input signal and the first reference signal to a desired first frequency range;

a first fixed bandpass filter configured to have a top passband frequency above the first frequency range and to provide a first filtered output signal;

a second signal source configured to provide a second reference signal;

a second mixer configured to receive the first filtered signal and the second reference signal, and further configured to mix the first filtered signal and the second reference signal to a desired second frequency range;

a second fixed bandpass filter configured to have a center frequency and bandwidth not overlapping with the first bandpass filter, thereby providing a second filtered output signal with a scannable variable bandwidth passband characteristic useful for examining the time varying characteristics of the input signal; and control means for controlling the first and second signal sources in accordance with time-varying characteristics of interest.

2. The filter of claim 1 wherein the first and second fixed bandpass filters are acoustic wave filters.

3. The filter of claim 1 wherein the first and second mixers and the first and second fixed bandpass filters are set to a center frequency and a bandwidth of a transducer coupled to the input node.

4. The filter of claim 1 wherein the first and second mixers and the first and second fixed bandpass filters are set to control a ratio of blood noise to tissue by filtering a higher frequencies contained in the input signal.

5. The filter of claim 4 wherein an operator controls the ratio of blood noise to tissue.

6. The filter of claim 1 wherein the first and second mixers and the first and second fixed bandpass filters are set to a center frequency and a bandwidth of a second harmonic of a selected portion of the unprocessed signals.

7. The filter of claim 6 wherein the first and second mixers and the first and second fixed bandpass filters are set to a reduced bandwidth to optimize a ratio of signal to noise.

8. The filter of claim 6 wherein the first and second mixers and the first and second fixed bandpass filters are set to a center frequency and a bandwidth to show the location of stints.

9. The filter of claim 6 wherein the first and second mixers and the first and second fixed bandpass filters are set to a center frequency and a bandwidth to show a location of dense tissue material.

10. The filter of claim 6 wherein the first and second mixers and the first and second fixed bandpass filters are set to a center frequency and a bandwidth to segment an image into a fundamental portion and a second harmonic portion.

11. The filter of claim 10 wherein the fundamental portion and the second harmonic portion are displayed side-by-side.

12. The filter of claim 10 wherein the second harmonic portion is displayed in color overlaying the fundamental portion.

13. The filter of claim 1 wherein the first and second mixers are low-side mixers.

14. The filter of claim 1 wherein the first mixer is a high-side mixer and the second mixer is a low-side mixer.

15. The filter of claim 1 wherein the input signal is generated by an acoustic transducer.

16. The filter of claim 15 wherein the transducer operates at a frequency of about 30 MHz or higher.

17. The filter of claim 1 wherein the second filtered output is coupled to a computer system including:

a means for converting the second filtered output into a digital format;

memory for storing the digitized second filtered output;

a processor for manipulating contents of the memory to form an image; and a display for displaying the image.

18. In an ultrasound imaging system, an slewing bandpass filter for selective passage of time varying acoustic signals representative of artifacts of reflection of tissue and fluid, the adaptive bandpass filter comprising:

an input node configured to receive unprocessed signals at a frequency of reflected artifact signals, the unprocessed signals constituting an input signal;

a first voltage controlled oscillator configured to provide a first reference signal;

a first mixer configured to receive the input signal and the first reference signal, and further configured to mix the input and reference signals to a desired first frequency range;

a first fixed bandpass filter configured to have a top passband frequency above the first frequency range and to provide a first filtered output signal;

a second voltage controlled oscillator to provide a second reference signal;

a second mixer configured to receive the first filtered signal and the second reference signal, and further configured to mix the first filtered signal and the second reference signal to a desired second frequency range;

a second fixed bandpass filter configured to have a center frequency and bandwidth not overlapping with the first bandpass filter bank, thereby providing a second filtered output signal with a scannable variable bandwidth passband characteristic useful for examining the time varying characteristics of the input signal; and control means for controlling the first and second voltage controlled oscillators in accordance with time-varying characteristics of interest, wherein the first and second mixers and the first and second fixed bandpass filters are set to a center frequency and a bandwidth of a second harmonic of a transducer coupled to the input node.

19. In an ultrasound imaging system, a method for filtering time varying acoustic signals representative of artifacts of reflection of tissue and fluid comprising the steps of:

receiving unprocessed signals at a frequency of reflected artifact signals constituting an input signal;

generating a first oscillating reference signal;

mixing the input signal and the first reference signal to a desired first frequency range to generate a first mixed signal;

bandpass filtering the first mixed signal to a top passband frequency above the first frequency range to provide a first filtered output signal;

generating a second oscillating reference signal;

mixing the first filtered output and the second reference signals to a desired second frequency range to generate a second mixed signal;

bandpass filtering the second mixed signal to a center frequency and bandwidth not overlapping with the first bandpass filtering step, thereby providing a second filtered output signal with a scannable variable bandwidth passband characteristic useful for examining the time varying characteristics of the input signal; and controlling the first and second oscillating reference signals in accordance with time-varying characteristics of interest.

20. The method of claim 19 wherein the first and second mixing steps and the first and second filtering steps are tuned to a center frequency and a bandwidth of the input signal.

21. The method of claim 19 wherein the first and second mixing steps and the first and second filtering steps are tuned to a center frequency and a bandwidth of a transducer generating the unprocessed signals.

22. The method of claim 19 wherein the first and second mixing steps and the first and second filtering steps are tuned to a center frequency and a bandwidth are tuned to control a ratio of blood noise to tissue by filtering a higher frequencies contained in the input signal.

23. The method of claim 22 wherein an operator controls the ratio of blood noise to tissue.

24. The method of claim 19 wherein the first and second mixing steps and the first and second filtering steps are tuned to a center frequency and a bandwidth are tuned to a center frequency and a bandwidth of a second harmonic of a selected portion of the unprocessed signals.

25. The method of claim 19 wherein the first and second mixing steps and the first and second filtering steps are tuned to a center frequency and a bandwidth to segment an image into a fundamental portion and a second harmonic portion.

26. The method of claim 25 further including the step of displaying the fundamental portion and the second harmonic portion side-by-side.

27. The method of claim 25 further including the steps of:
colorizing the second harmonic portion; and
overlaying the colorized second harmonic portion over the fundamental portion.

28. The method of claim 27 further including a step of colorizing the fundamental portion.

29. The method of claim 19 wherein the first and second mixing steps mix down their respective input signals.

30. The method of claim 19 wherein the first and second mixing steps mix up their respective input signals.

* * * * *